L. YALE, Jr.
Improvement in Locks.
No. 5,131. Reissued Nov. 5, 1872.
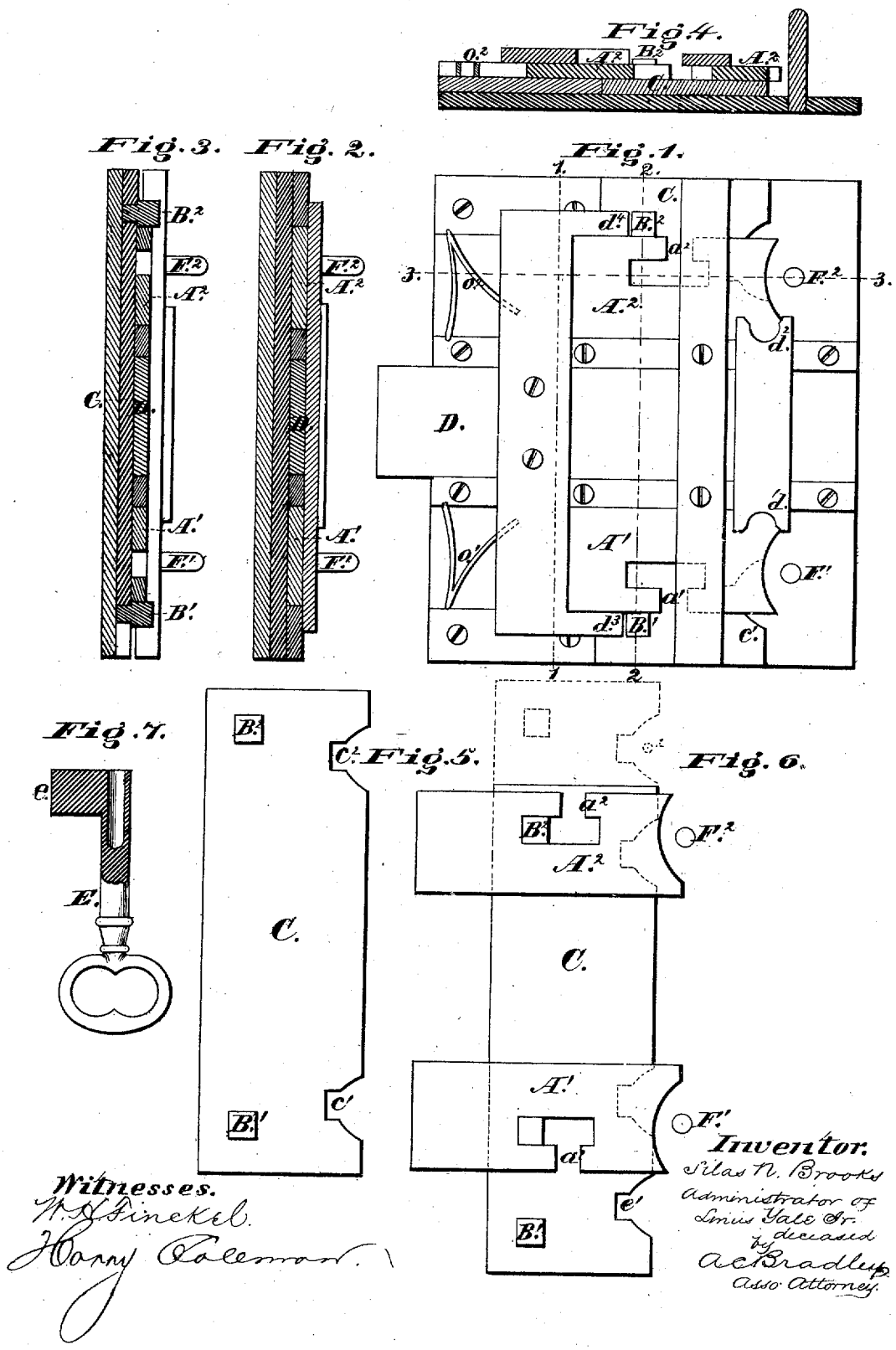
AM. PHOTO-LITHOGRAPHIC CO. N.Y. (OSBORNE'S PROCESS.)

UNITED STATES PATENT OFFICE.

SILAS N. BROOKS, OF BERNARDSTON, MASSACHUSETTS, ADMINISTRATOR OF LINUS YALE, JR., DECEASED.

IMPROVEMENT IN LOCKS.

Specification forming part of Letters Patent No. 22,048, dated November 9, 1858; reissue No. 5,131, dated November 5, 1872.

*To all whom it may concern:*

Be it known that LINUS YALE, Jr., deceased, late of Shelburne Falls, in the county of Franklin and State of Massachusetts, during his lifetime invented a new and Improved Manner of Constructing Locks for Safes, Banks, Doors, &c.; and that the following is a full and exact description of the same, reference being had to the drawing hereunto annexed.

The nature of this improvement consists in providing a main bolt with two or more sets of stops or tumblers, to be operated by one or more keys; the tumblers so arranged that by the application of one key from the outside of a safe or other structure to which my lock is applied, the bolt of the lock shall be operated to lock or unlock the safe by the operation of the one key independently of the others. These sets of tumblers may be of similar construction, requiring the application of one common key, or of entirely different kinds, requiring a different key or adjustment, the object being to provide a way to get into the safe from the outside thereof by two or more keys working independently of each other upon the lock mechanism at any time without violence, even though one part of the lock may be disarranged by accident or otherwise.

In the drawing, Figure 1 is a plan of the lock, showing the general arrangement of two of the simplest forms of tumblers to hold out the main bolt D by the two fence-pins $B^1$ and $B^2$ on the cross-bolt C. Fig. 2 is a vertical section of the same through 1 1. Fig. 3 is a vertical section through 2 2. Fig. 4 is a horizontal section through 3 3. Fig. 5 is a plan of cross-bolt C. Fig. 6 is another plan of cross-bolt C moved into an unlocked position. Fig. 7 is the key E in section.

The main bolt D slides in the usual manner by means of the key working in the one or the other of two talons, $d^1$ and $d^2$, in the ordinary manner. The cross-bolt C is also provided with two similar talons, $c^1$ and $c^2$, for another portion of the revolution of the key to engage in; and it has also two fence-pins, $B^1$ and $B^2$, fitted to pass through the gatings $a^1$ and $a^2$ of the tumblers $A^1$ and $A^2$, respectively. These fence-pins, when the lock is locked, stand immediately behind the arms or projections $d^3$ and $d^4$ on the main bolt D, thereby preventing its retraction until provision is made for it by adjustment of one of the tumblers, hereinafter more particularly described. The cross-bolt C is moved from its present position either one way or the other, as the key is applied above or below, the effect being precisely the same on the bolt whether the fence goes up or down, as it releases it either way. The tumblers $A^1$ and $A^2$ slide in the same direction as the bolt D, being driven one way by the key and back again by springs $o^1$ and $o^2$ in the ordinary manner. They are gated, $a^1$ and $a^2$, as usual, for the passage of the fence-pins $B^1$ and $B^2$. The drill-pins $F^1$ and $F^2$ serve to steady the key in its revolution.

The drawing shows only the working parts of the lock without cases or cover, that all parts may be distinctly seen.

*Operation.*

By putting the key on the drill-pin $F^1$ and turning to the right, the wing or bit *e* will drive the tumbler $A^1$ to the proper distance to bring the gating $a^1$ opposite the fence-pin $B^1$, when the key engages immediately with the talon $c^1$, and while still holding the tumbler in position moves the cross-bolt C until the fence-pin $B^1$ has passed through the gating, thereby releasing the main bolt (for, the other fence-pin, it will be observed, does not require to pass through a gating in moving upward) when the key, having worked into the talon $d^1$ of the main bolt D, retracts it, at the same time it allows the tumbler to be driven back to its original position; but, should anything prevent thus adjusting the tumbler $A^1$, or passing the fence-pin $B^1$ through it, and consequently the retraction by that means of the main bolt D, it will be seen that the key may be applied to the other drill-pin $F^2$, and being revolved to the left will adjust the tumbler $A^2$ to admit of its passing the fence-pin $B^2$, thereby releasing the main bolt D precisely as well as though the other application had been successful and entirely regardless of the position of the tumbler $A^1$. In locking, the key must, of course, be applied to the part unlocked, as the one which is locked cannot be more locked.

What I claim as the invention of said LINUS YALE, Jr., and desire to secure by Letters Patent, is—

A lock provided with two or more sets or systems of tumblers, operated by the same key, or by different keys, so that the main bolt can be retracted and thrown by means of any one set with its key independently of the others.

SILAS N. BROOKS.

Witnesses:
G. M. PLYMPTON,
JOHN B. YALE.